Sept. 20, 1932.  H. G. BRUNER  1,877,805
SOLID RUBBER TIRE
Filed Sept. 14, 1927  2 Sheets-Sheet 1

Inventor
Harold G. Bruner
By Jas. H. Churchill
Atty.

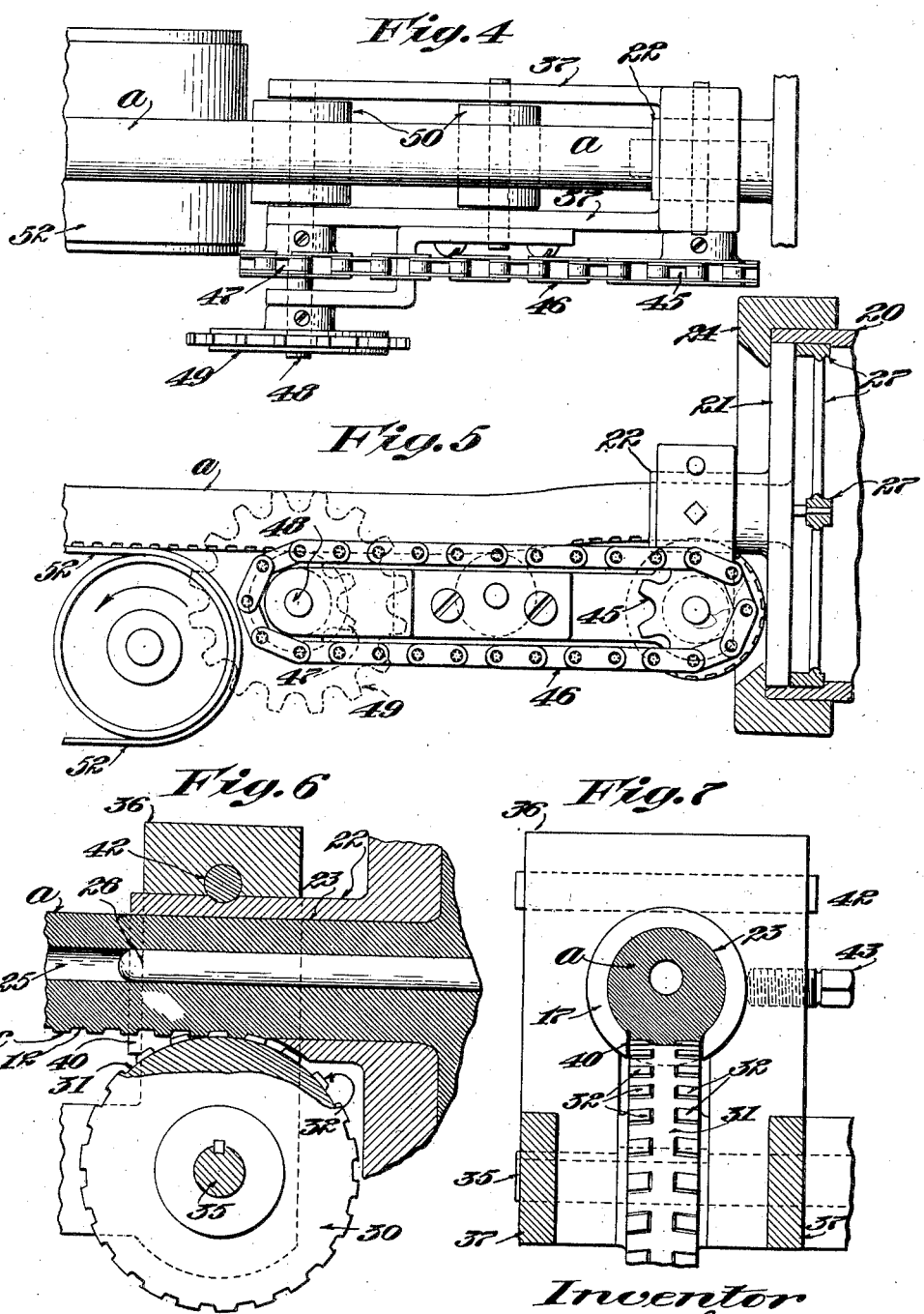

Patented Sept. 20, 1932

1,877,805

UNITED STATES PATENT OFFICE

HAROLD G. BRUNER, OF WAKEFIELD, MASSACHUSETTS, ASSIGNOR TO BOSTON WOVEN HOSE & RUBBER COMPANY, OF CAMBRIDGE, MASSACHUSETTS, A CORPORATION OF MASSACHUSETTS

SOLID RUBBER TIRE

Application filed September 14, 1927. Serial No. 219,482.

This invention relates to a novel rubber tire of the type known as a solid tire.

The novel tire comprises a body portion provided with a continuous, substantially circular, transverse wall, and a tread member integral with said wall and having a substantially flat, outer surface extended on opposite sides of the axis of the substantially circular body portion and provided with anti-skid members.

A rubber tire of this character is capable of being produced at a minimum cost by making a tire-forming member of a length greater than the length of a single tire and forming the tread member and its antiskid members while the body portion of the tire-forming member is in motion in the direction of its length and while the rubber is in an unvulcanized condition, after which the tire-forming member may be vulcanized and cut up into proper lengths, according to the diameter of the wheel with which it is used.

It may be preferred to form the tread member and provide the latter with the anti-skid members substantially as fast as the circular body portion is formed, or the anti-skid tread surface may be formed after a material length of the circular body portion has been formed, as will be described.

In the present instance, I have illustrated novel apparatus for making antiskid tires of the so-called solid type, whose substantially circular body portion is of relatively small diameter to adapt the tires for use on the wheels of children's vehicles, such as the so-called kiddie cars and the like.

These and other features of this invention will be pointed out in the claims at the end of this specification.

Figure 1:
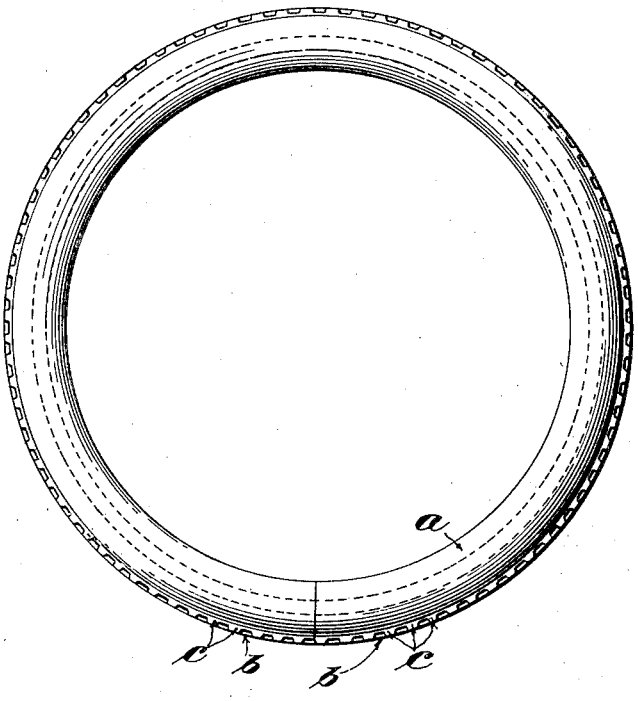
Figure 2:
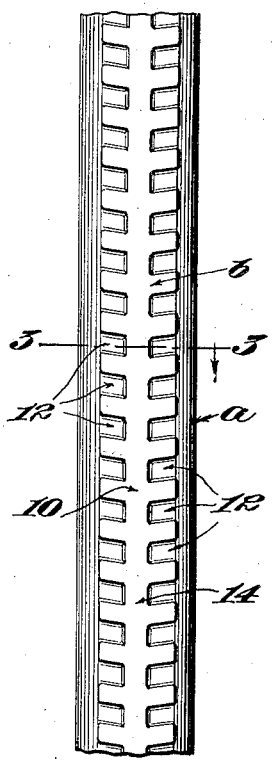
Figure 3:
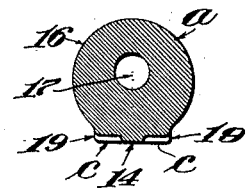

Fig. 1 is a side elevation of a rubber tire embodying the invention;

Fig. 2, an elevation on an enlarged scale of a portion of the tire shown in Fig. 1;

Fig. 3, a cross section on the line 3—3, Fig. 2;

Fig. 4, a plan view of a sufficient portion of one form of apparatus for making the tire shown in Fig. 1;

Fig. 5, a side elevation of the apparatus shown in Fig. 4, showing in section a portion of the cylinder of the extruder which is not shown in Fig. 4;

Fig. 6, a detail in section and elevation on an enlarged scale of the nozzle and die member shown in Figs. 4 and 5, and Fig. 7, an end elevation of the parts shown in Fig. 6, looking toward the right, a portion of the frame which supports the die member being shown in section.

The improved rubber tire herein shown is provided with a substantially circular body portion $a$ and a tread member $b$ integral with the body portion $a$ and provided with antiskid members $c$.

The body portion $a$ is of the so-called solid tire construction, in that, it is provided with a continuous, transverse, circumferential wall, in contradistinction to the automobile tire whose inner circumference is split circumferentially to provide for the insertion of the usual inner tube.

The tread member $b$ has a substantially flat, outer surface 10, which extends on opposite sides of a vertical plane through the axis of the body portion $a$ and is provided with a plurality of recesses 12, which form of portions of the tread member $b$ the antiskid members $c$.

In the present instance the recesses 12 are arranged so that the tread member is provided with a continuous center surface portion 14 and with the antiskid members $c$ extended laterally therefrom with their outer flat surfaces forming lateral continuations of the flat surface of the center portion 14 (see Figs. 2 and 3), and the width of the tread member is less than but approximates the diameter of the body portion $a$, whereby the latter is provided with a tread member having a transverse flat outer surface of substantial width.

In the construction of the solid tire herein shown, the body portion $a$ has a continuous, outer, transverse, circular wall 16 having the center 17 (see Fig. 3), and the center strip or portion 14 of the outer surface of the tread member frame forms part of this circular wall, whereas the antiskid members $c$ and especially the outer end portions thereof project beyond or outside of the circular wall 16 and the outer ends of said antiskid members are substantially straight and co-operate to provide the tread member *b* with substantially straight side walls or shoulders 19 which project outwardly from the circular wall 16 of the body portion (see Fig. 3) into a transverse plane substantially tangent to the center strip 14, whereby the substantially flat surfaces of the antiskid members *c* and the substantially flat outer surface of the center strip 14 are in the same plane substantially tangent to the circular wall 16, so that the tread member *b* is provided with a wide surface which is substantially flat transversely of the circular body portion and extends laterally on both sides of a vertical plane through the axis of said body portion.

As a result there is produced a rubber tire of the so-called solid type which is provided with an antiskid tread surface, which approximates in appearance and in use the pneumatic automobile tires, and which can be produced at such low cost as to make them available for use on children's vehicles, such as kiddie cars and the like.

The invention further has for its object to provide a novel method of and apparatus for producing solid tires of the character described, in a practical and economical manner.

To this end, the circular body portion *a* is formed while the rubber of which it is composed is in an unvulcanized and more or less substantially plastic workable condition, and while said body portion is in motion in the direction of its length, a part of the said body portion is subjected to pressure to form the tread member *b* and to provide it with the antiskid members.

An apparatus for performing the steps of the process comprises a body-forming unit and a tread-forming unit, which latter may and preferably will be arranged as herein shown, in close proximity to the body-forming unit.

The body-forming unit may be of the extrusion type and such as commonly used in factories for making rubber tubing.

A portion only of such extrusion unit, sufficient for a clear understanding of the working of the same, is herein shown.

The extrusion unit consists essentially of a cylinder 20 into which the unvulcanized rubber in the form of dough is placed and forced out therefrom by a suitable worm, not shown. The cylinder 20 at its front or outlet end is provided with a head 21 having a nozzle 22 provided with a cylindrical bore 23 of the diameter it is desired that the cylindrical body portion *a* of the tire should have. The head 21 is removably held in the cylinder 20 by a suitable clamping member 24 of known construction. The extruder is commonly used for making tubing which is provided with a suitable passage or bore and in the manufacture of solid rubber tires it is preferred to provide the same with a relatively small bore 25 for the reception of a wire, not shown, by which the tire is attached to the rim of the wheel in any known manner.

To this end, the nozzle 22 has extended into it a spindle or rod 26 of materially smaller diameter than the internal diameter of the nozzle. The spindle 26 is affixed at its inner end to a spider 27 within the cylinder 20 in proximity to the head 21 but separated therefrom by a sufficient space to permit of the free passage of the dough into the nozzle.

The nozzle 22 imparts to the dough a cylindrical form, and forms a body of rubber dough which is circular in cross section, and a portion of the transverse circumference of the circular body is compressed and shaped to form the tread member *b* while the cylindrical body of dough is being moved in the direction of its length.

The tread member *b* is formed by a tread-forming unit which may be located in close proximity to the nozzle 22 as herein shown, or which may be located at a distance therefrom.

The tread-forming unit may be made as shown and consists of a wheel 30 having a substantially wide and transversely flat or straight periphery 31 having thereon projections or members 32 for forming the recesses 12 of the tread member *b*.

The wheel 30 having the projections 32 on its periphery will be hereinafter referred to as the die member.

The die member 30 is fast on a shaft 35 mounted in a supporting frame, herein shown as comprising a yoke-shaped member 36 and substantially parallel side bars 37 extended from the lower ends of the yoke-shaped member 36.

It may be preferred to form the tread member *b* substantially as fast as the cylindrical body of dough is formed in the nozzle 22, and to this end, the tread-forming unit is mounted on the nozzle and the latter is provided on its under side with a slot 40 (see Figs. 6 and 7) which extend from the front end of the nozzle but partially the length thereof, and the die member 30 is arranged below the nozzle so that it extends into the slot and is positioned so that the periphery of the die member is tangent transversely with the circumference of the cylindrical body of dough near the vertical center of said body as represented in Fig. 7.

The recess-forming projections 32 on the periphery of the die member 30 project into the nozzle and act to form the recesses 12 in the cylindrical body of dough and also to displace the dough and fill the spaces at the sides of the slot 40 and thereby form the substantially flat or straight antiskid members *c* and the substantially straight shoulders or side walls 19 of the tread member, as clearly shown in Fig. 7.

The tread-forming unit may be fastened on the nozzle 22 by a pin 42 and set screw 43.

It will be observed by reference to Fig. 7 that the width of the periphery of the die member 30 is less than the internal diameter of the nozzle 22 and of the diameter of the circular body portion $a$ of the tire formed in said nozzle, and consequently the tread member $b$ is of less width than the diameter of the body portion $a$, which enables the improved solid tire to be formed in a continuous manner and of any desired length.

To properly form the antiskid members $c$ in the tread member, it is desirable that the die member 30 should move at the same speed as the cylindrical body of dough, and to this end, the rotatable die member is geared to the mechanism of the extruder unit which effects the feed or longitudinal movement of the cylindrical body of dough through the nozzle 22.

To this end, the shaft 35 of the die member 30 is provided with a sprocket wheel 45 which is connected by a link chain 46 to a sprocket wheel 47 on a shaft 48 supported by the side bars 37, and said shaft is provided with a second sprocket wheel 49 which is operatively connected in a suitable manner with the operating mechanism of the extruder.

This connection is not herein shown, as it is well understood and may be of any suitable construction.

The side bars 37 of the tread-forming unit preferably support loose rollers 50 which in turn support the tire member after it has been formed and while it is being transferred to an endless belt 52 which may convey it to a vulcanizing apparatus, not shown, but of known construction, wherein the substantially plastic tire-forming member is vulcanized, or which may convey it to a place where the unvulcanized tire member of any desired length within limits may be wound into a form convenient for placing it in the vulcanizer.

From the above description, it will be seen that a tire-forming member of many feet in length and capable of being cut up into sections or shorter lengths, each suitable for use as a tire, may be formed in a minimum time and at a minimum cost.

I have shown one construction or arrangement of apparatus for providing a tire-forming member of the so-called solid rubber type with a tread member having antiskid members while the tire-forming member is in motion in the direction of its length, but it is not desired to limit the invention to the particular apparatus shown with which such method may be practised.

By the term "rubber" I desire to be understood as including not only pure rubber but compositions of rubber commonly used in the manufacture of tires.

What I claim is:

1. A rubber tire having a solid all-rubber body portion substantially circular in cross section and provided with a longitudinally extended bore, and having a tread member extended longitudinally of the said body portion and circumferentially of the tire and normally forming part of said substantially circular body portion, said tread member being provided with an outer surface substantially flat transversely of the tire and of less width than the diameter of the body portion through said bore and having recesses to provide said tread member with antiskid members and said body portion having a circular outer surface extended transversely of the tire from one side of the tread member to the other side thereof.

2. A rubber tire having a body portion continuous in cross section and provided with a bore extended the length thereof, and having a tread member integral with said body portion and having an outer surface substantially flat transversely of the tire and provided with recesses on opposite sides of a vertical plane through the axis of the tire, said body portion having an outer surface circular transversely of the tire and extended in the same circle from one side of the tread to the other side of said tread, the latter being of less width than the diameter of the circular body portion through said bore.

3. A tubular body of rubber substantially circular and continuous in cross-section and having extended the length thereof a bore and a substantially flat tread member of less width than the horizontal diameter of said tubular body portion through the center thereof and provided with depressions on opposite sides of the longitudinal center of the said tread member, said tubular body being of such length as to enable it to be cut up into a plurality of lengths or sections to form a plurality of solid rubber tires, each having a non-skid tread member.

In testimony whereof, I have signed my name to this specification.

HAROLD G. BRUNER.

CERTIFICATE OF CORRECTION.

Patent No. 1,877,805.                                         September 20, 1932.

HAROLD G. BRUNER.

It is hereby certified that error appears in the printed specification of the above numbered patent requiring correction as follows: Page 1, line 96, strike out the word "frame"; and that the said Letters Patent should be read with this correction therein that the same may conform to the record of the case in the Patent Office.

Signed and sealed this 29th day of November, A. D. 1932.

M. J. Moore,
Acting Commissioner of Patents.

(Seal)